Feb. 21, 1956  D. A. TAYLOR  2,735,778
INDIVIDUALLY PACKAGED FROZEN CONFECTION
Filed Sept. 5, 1952  2 Sheets-Sheet 1
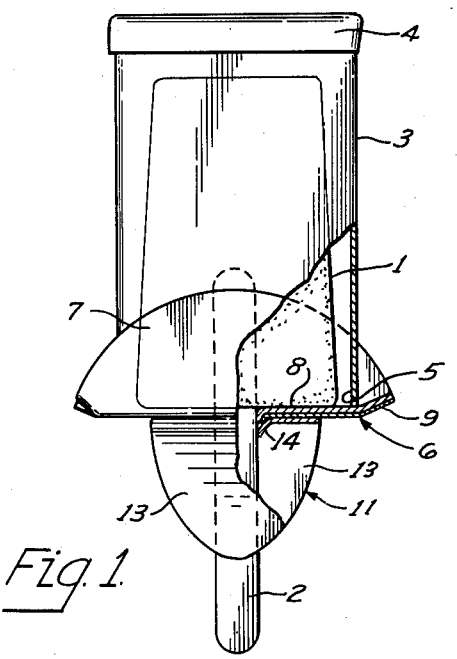
Fig. 1
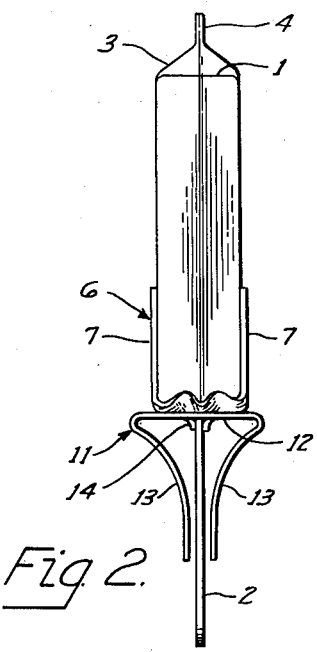
Fig. 2
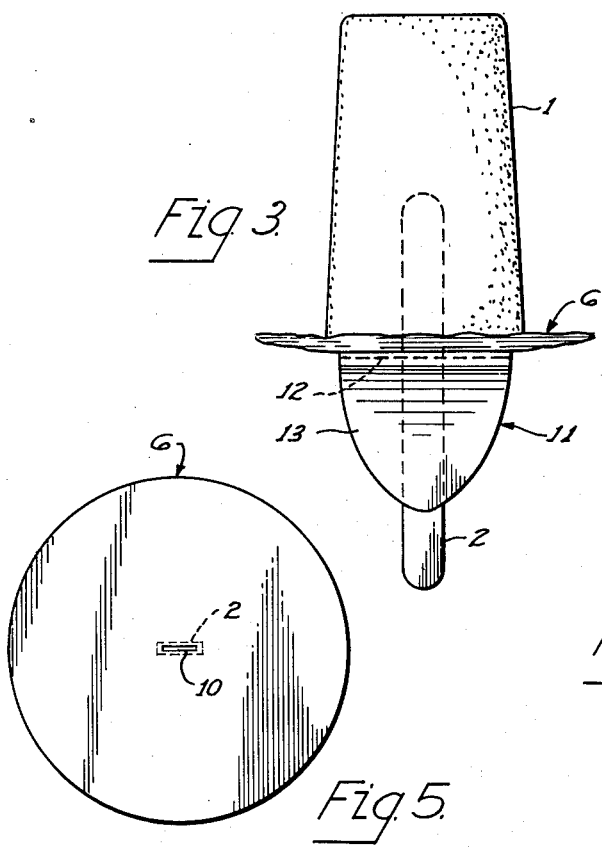
Fig. 3
Fig. 5
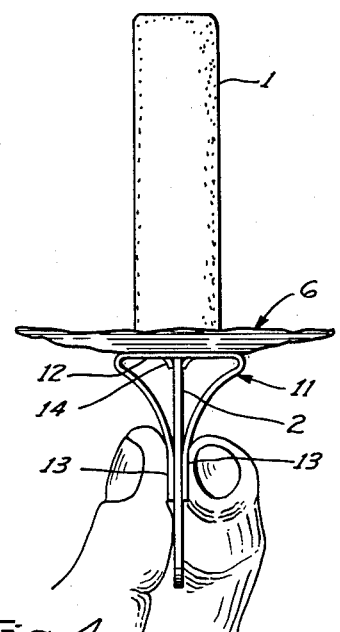
Fig. 4
INVENTOR.
Don A. Taylor,
BY Eseler & Leonard,
His ATTORNEYS.

Feb. 21, 1956 D. A. TAYLOR 2,735,778
INDIVIDUALLY PACKAGED FROZEN CONFECTION
Filed Sept. 5, 1952 2 Sheets-Sheet 2

INVENTOR.
Don A. Taylor,
BY
his ATTORNEYS

United States Patent Office 2,735,778
Patented Feb. 21, 1956

2,735,778
INDIVIDUALLY PACKAGED FROZEN CONFECTION

Don A. Taylor, Wadsworth, Ohio

Application September 5, 1952, Serial No. 307,999

7 Claims. (Cl. 99—180)

This invention relates to individually packaged frozen confections of the type comprising a frozen body of comestible material with a handle protruding from one end.

Heretofore individually packaged frozen confections of this general type have been provided, a common example being a bar of chocolate covered ice cream with a flat stick imbedded at one end therein and extending outwardly therefrom so as to provide a handle.

A common manner of packaging such bars individually is to enclose the body in an envelope or moisture-proof bag which is open at the end opposite of the handle, the handle extending through a small aperture in the closed end or base of the bag. In this form of the invention, the bag is somewhat difficult to remove. Generally, it is so tightly adherent to the frozen body that it must be stripped off a piece at a time until it is entirely removed and it is often quite difficult to remove the base of the bag from the stick inasmuch as the base of the bag is of several thicknesses of paper. On the other hand, if the bag is to be slid off of the body, it is necessary to grasp the end of the handle, slide the bag partway off of the bar and then tear the bag open so that the handle can be grasped near the base of the body and released at the outer end after which the bag can be slid entirely off the handle. In either effect, the operation is somewhat messy and usually the bag is completely destroyed in the process of removal.

Another type of packaging of such bars is illustrated in United States Patent No. 1,947,872, issued on February 20, 1934, to J. J. Nolte. In this type of packaged confection, a relatively rigid shallow base plate is provided on the handle at the base of the confection and a container of corrugated paper opening toward the base plate encloses the body of comestible material and has its lower open end fitted within the rim of the plate, the plate extends a very slight distance outwardly beyond the circumference of the base of the body and of the periphery of the open end of the container.

This latter type of packaging is objectionable in that an adequate drip pan or shield is not provided and were one provided of adequate diameter and constructed in the form disclosed in the above identified patent, the resulting shield would present serious difficulties in the packaging in a group of the individually packaged confections in the usual bulk shipping container.

Furthermore, in this latter type of confection, the confection must be built up in the container and not merely packaged in the container after having been previously formed by the usual machine methods.

The present invention is directed to a packaged stick or handle supported frozen confection of which the comestible body with the handle attached can be manufactured unpackaged by the processes and equipment customarily in use and then, after processing, can be packaged readily in a manner such that an effective drip shield is provided and the resultant packaged article is of a construction and external configuration such that a number of them can be packaged in the usual bulk shipping carton within the same space as is customarily provided for the conventional enveloped enclosed handle supported ice cream bars of like sizes.

For the purposes of illustration, the invention will be described as applied to a chocolate coated ice cream bar, its application to other forms of handle supported frozen confections such as sherbets, ices, and the like, being readily apparent from the illustrative example.

Various other objects and advantages of the invention will become apparent from the following description wherein reference is made to the drawings in which:

Figure 1 is a front elevation, partly in section, of a packaged frozen confection embodying the principles of the present invention;

Figure 2 is a side elevation of the packaged frozen confection illustrated in Figure 1;

Figure 3 is a front elevation of the confection with the bag or envelope removed and the drip pan and reinforce in operating position;

Figure 4 is a side elevation of the structure illustrated in Figure 3 and showing one manner in which the reinforce may be held in operating position;

Figure 5 is a top plan view of the drip pan used in connection with the package illustrated in Figures 1 through 4;

Figure 6:
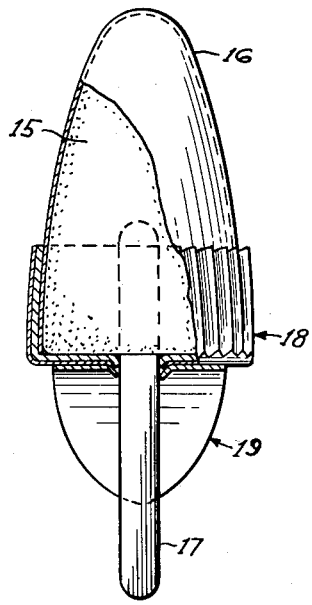
Figure 6 is a front elevation, partly in section, showing a modification of the packaged confection.

Referring first to Figures 1 through 5, the confection is shown as comprising a body 1 in the form of the conventional chocolate ice cream bar in which is imbedded one end of the usual stick handle 2 which protrudes outwardly from the base of the body.

Enclosing the body 1 is an envelope or bag 3 of moisture-proof material, such as the usual glazed or waxed paper, the bag being disposed with its closed end, indicated at 4, at the end of the body 1, opposite from the handle 2. The bag preferably is of sufficient size to loosely accommodate the bar and extend lengthwise of the bar so that its open end 5 is at the base of the body 1.

Disposed against the base of the body 1 is a foldable shield 6 which overlies the entire base of the body 1 and extends laterally a considerable distance beyond the lateral limits of the base of the body to provide a relatively wide margin 7. Normally, in the unopened packaged condition of the confection, the margin 7 of the shield 6 is folded upwardly into juxtaposition with the outer peripheral wall of the bag 3, lying flat thereagainst so as not to interfere with the packaging of the number of packaged confections in the usual bulk shipping carton. When so folded, the margin extends a substantial distance lengthwise of the body 1, for example, preferably a distance of from one-fourth to one-half the length of the body. The shield 6 is relatively stiff but is readily bendable by finger pressure into and out of the folded position described.

Preferably the shield is formed in two layers comprising an upper layer 8 exposed toward the base of the body 1 and lower layer 9 disposed against the underface of the layer 8. The layer 8 is preferably of highly absorbent paper which can readily absorb liquids of the consistency of melted ice cream and the like. The layer 9 is preferably of non-absorbent paper such as the glazed or waxed paper used for the bag 3, though preferably somewhat stiffer. If desired, the shield can be made so that only the upper face of the margin 7 is covered with the absorbent layer 8.

The absorbent material is not essential in all cases but is much preferred for children who are apt to spill any substantial accumulation of melted ice cream caught by the shield if it is not retained by absorbent material. In either event it makes possible the use of a smaller and shallower drip shield.

The shield 6 is provided with a central aperture 10 which is adapted to accommodate the handle 2 of the confection, the aperture 10 being made normally smaller than the cross section of the handle so that the handle must be forced thereinto and snugly embraced thereby, thus forming a seal between the shield 6 and handle 2.

In order to reinforce the shield 6, to assure that it will be held in proper operating position and to prevent it from collapsing after it has absorbed a substantial amount of melted ice cream, a reinforce 11 is provided. The reinforce has a base portion 12 adapted to engage the underside of the shield 6, the base 12 of the reinforce preferably being about coextensive with the base of the body 1. The reinforce also has one or more lateral portions 13 which depend from the base 12 and lie alongside the handle 2 in normal operating position. The portions 13, or a single portion 13 if only one is used, are readily flexible and bendable flatwise by the pressure of the fingers into a face to face juxtaposition with the handle 2.

Thus, as illustrated in Figure 4, the lateral portions 13 may be pinched between the fingers and pressed against the opposite flat faces of the handle 2 so as to frictionally hold the reinforce in position endwise of the handle.

The base portion 12 of the reinforce is provided with a central passage 14 which snugly embraces the handle 2, thus further assuring a seal to prevent melted ice cream from running down the lower portion of the handle. However, the reinforce 11 can be slid lengthwise of the handle and thus pushed up firmly against the bottom of the shield 6 and then pinched against the handle so that the reinforce is held firmly in position lengthwise of the handle and thereby holds and reinforces the shield and prevents it from collapsing when weakened by absorbed moisture or supporting the weight of a substantial accumulation of unabsorbed moisture. The reinforce is preferably made of relatively stiff glazed paper.

In order to package the confection in the usual shipping carton, the lateral margin 7 of the shield 6 and the lateral portion or portions 13 of the reinforce may be folded up alongside the wall of the bag 3.

Figure 7:
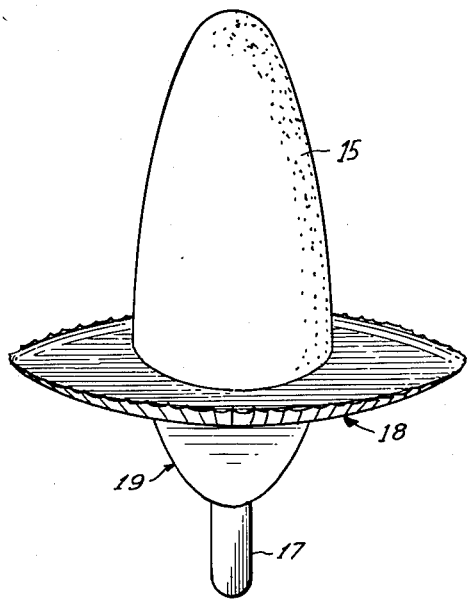
Figure 7 is a front elevation of the packaged confection illustrated in Figure 6 with the bag or envelope removed and the drip shield and reinforce in operating position.

Referring next to Figures 6 and 7, a packaged confection is illustrated but is modified for adaption to a differently shaped body of comestible material. In this modified form, the confection comprises a body 15 which is preferably circular in cross section and tapered slightly to an upper rounded end. The body 15 is enclosed in a bag 16 which preferably conforms rather closely to the contour of the body 15. A handle 17, similar to the handle 2 heretofore described, is provided. A drip shield 18 which may be of the same general construction of the drip shield 6 is provided and is folded up around the base portion of the body 15, the drip shield being pleated for this purpose. A reinforce 19 corresponding to the reinforce 11 is also provided. Both the shield 18 and the reinforce 19 can be fitted on to the handle 17 in the manner heretofore described.

In either form, if desired, the handle 2 may be shorter than is customarily provided, being of sufficient length to extend out of the body only far enough to extend through the base of the reinforce 11 and to be secured thereto. In such an instance, the reinforce is made of somewhat stiffer paper and itself serves as a handle.

To open the present confection, it is only necessary to fold outwardly the shield margin 7 which, being against the outside surface of the moisture-proof bag 3, does not adhere firmly thereto. The lateral portions 13 of the reinforce are likewise folded outwardly and downwardly into position. The bag is then slid off of the body 1 of the confection or, if it happens to adhere thereto in spots, is torn off. This is easily accomplished since the closed end of the bag does not underlie the base of the body and embrace the handle whereas in those instances in which the closed end of the bag underlies the base of the body and embraces the handle 2, the toughest and most difficult to remove portion of the bag is disposed in the most inaccessible place.

It is apparent, that a number of the present packaged confections can be packed in the same bulk shipping carton as an equal number of the ordinary bag enclosed ice cream bars of corresponding size, since the shield and reinforce do not interfere. Also the confection can be manufactured unpackaged in the same manner and with the same machinery as the frozen confections customarily provided and then readily packaged as described.

The forms of the invention described are examples embodying the principles of the invention and modifications may be made in the specific structures shown without departing from broader principles disclosed and claimed.

Having thus described my invention, I claim:

1. A frozen confection including a body of frozen confection, a handle connected thereto and extending from the base thereof, a shield disposed against the base and having a passage through which the handle extends, said shield having a margin which throughout its peripheral extent extends outwardly beyond the body, a relatively stiff reinforce including a base portion having a passage through which the handle extends and in supporting relation to the underface of the shield and having a lateral portion angularly disposed to the plane of the base portion and extending away from the body lengthwise of the handle and lying alongside the handle, and said lateral portion being readily bendable toward and against a side of the handle by finger pressure.

2. A frozen confection according to claim 1 characterized in that said angularly disposed portion extends from one edge of the base portion, and another angularly disposed portion extends from the opposite edge of the base portion, and said angularly disposed portions are disposed in face to face spaced relation to the faces of the handle, respectively, and are readily bendable by finger pressure into contact with opposite faces of the handle for frictionally holding the reinforce in place in supporting relation to the shield.

3. A frozen confection comprising a body of frozen confection, a handle connected thereto and extending from the base thereof, a shield disposed against said base and having a passage through which the handle extends, said shield having a margin which, throughout its peripheral extent, extends outwardly beyond the body, and at least the upwardly exposed portion of said margin being of moisture absorbing material, a relatively stiff reinforce having a base portion in supporting relation to the underface of the shield, the base portion having a passage through which the handle extends and having a lateral portion connected to one of its edges and angularly disposed to the plane of the base portion, and extending downwardly in a direction away from the body lengthwise of the handle, and lying alongside the handle, and said lateral portion is movable laterally of the handle toward and into engagement with a side of the handle.

4. A frozen confection according to claim 3 characterized in that said reinforce has a passage through its base portion accommodating the said handle and mounting the reinforce on the handle for movement endwise of the handle.

5. A frozen confection according to claim 3 characterized in that said lateral portion is bendable laterally of the handle into juxtaposition with a side of the handle by pressure of the fingers, and the reinforce is frictionally held by engagement of said portion and handle, when under said pressure, in fixed position along the handle.

6. A frozen confection according to claim 3 characterized in that said reinforce comprises a piece of relatively stiff bendable paper having a fold dividing it into said base portion and lateral portion.

7. A frozen confection comprising a body of frozen confection, a handle connected thereto and extending from the base thereof, a shield disposed against said base and having a passage through which the handle extends, said shield having a margin which, throughout its peripheral extent, extends outwardly beyond the body, and at least the upwardly exposed portion of said margin being of moisture absorbing material, a relatively stiff reinforce having a base portion in supporting relation to the undersurface of the shield, and having two lateral portions angularly disposed to, and extending from opposite edges of, the base portion and disposed along opposite sides of the handle, respectively, and said lateral portions being bendable laterally of the handle into engagement with opposite sides of the handle, and said base portion having a passage through which the handle extends.

References Cited in the file of this patent

UNITED STATES PATENTS

| | | |
|---|---|---|
| 1,761,703 | Brimer | June 3, 1930 |
| 1,947,872 | Nolte | Feb. 20, 1934 |
| 2,027,791 | Schraeger | Jan. 14, 1936 |
| 2,162,224 | Legge | June 13, 1939 |
| 2,450,364 | Smith | Sept. 28, 1948 |
| 2,627,472 | Valenta | Feb. 3, 1953 |
| 2,632,708 | Sueskind | Mar. 24, 1953 |